(12) United States Patent
Johnson, Sr. et al.

(10) Patent No.: US 9,097,277 B2
(45) Date of Patent: Aug. 4, 2015

(54) MONOPOD HEAD

(71) Applicants: Joseph M. Johnson, Sr., San Luis Obispo, CA (US); Verent Chan, San Luis Obispo, CA (US)

(72) Inventors: Joseph M. Johnson, Sr., San Luis Obispo, CA (US); Verent Chan, San Luis Obispo, CA (US)

( * ) Notice: Subject to any disclaimer, the term of this patent is extended or adjusted under 35 U.S.C. 154(b) by 19 days.

(21) Appl. No.: 13/788,365

(22) Filed: Mar. 7, 2013

(65) Prior Publication Data

US 2013/0236235 A1     Sep. 12, 2013

Related U.S. Application Data

(60) Provisional application No. 61/608,327, filed on Mar. 8, 2012.

(51) Int. Cl.
| | |
|---|---|
| *F16L 3/00* | (2006.01) |
| *F16C 11/04* | (2006.01) |
| *F16M 11/04* | (2006.01) |
| *F16M 11/10* | (2006.01) |
| *F16M 13/00* | (2006.01) |
| *G03B 17/56* | (2006.01) |

(52) U.S. Cl.
CPC .............. *F16C 11/04* (2013.01); *F16M 11/041* (2013.01); *F16M 11/10* (2013.01); *F16M 11/105* (2013.01); *F16M 13/00* (2013.01); *F16M 2200/022* (2013.01); *F16M 2200/028* (2013.01); *G03B 17/561* (2013.01); *Y10T 403/32008* (2015.01)

(58) Field of Classification Search
CPC ........... G03B 17/561; F16M 2200/022; F16M 2200/028
USPC .......... 248/177.1, 178.1, 179.1, 180.1, 181.1, 248/181.2, 176.1
See application file for complete search history.

(56) References Cited

U.S. PATENT DOCUMENTS

| | | | | |
|---|---|---|---|---|
| 2,326,657 | A * | 8/1943 | Johnston | 396/428 |
| 2,771,826 | A * | 11/1956 | Shapiro | 224/257 |
| 3,128,982 | A * | 4/1964 | Christopher | 248/183.2 |
| 6,264,152 | B1 * | 7/2001 | Bloch et al. | 248/274.1 |
| 8,783,975 | B1 * | 7/2014 | Cifers | 396/428 |

* cited by examiner

*Primary Examiner* — Amy Sterling
(74) *Attorney, Agent, or Firm* — Chernoff Vilhauer McClung & Stenzel, LLP

(57) ABSTRACT

A monopod head enables movement of an optical instrument relative to a longitudinal axis of a monopod in directions parallel or normal to the optical axis of the instrument and includes a robust braking system to control movement of heavy instruments.

4 Claims, 8 Drawing Sheets

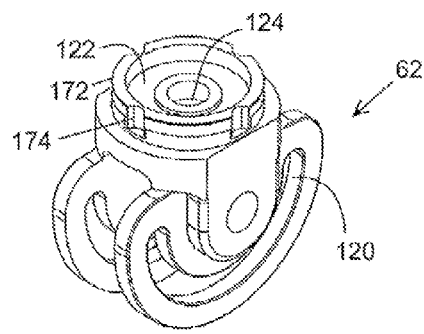
FIG. 8
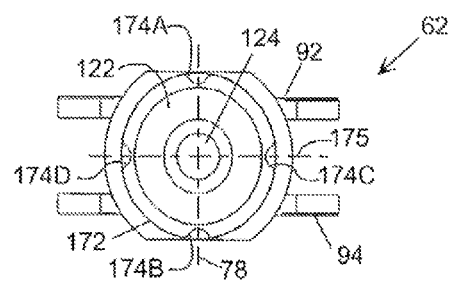
FIG. 9
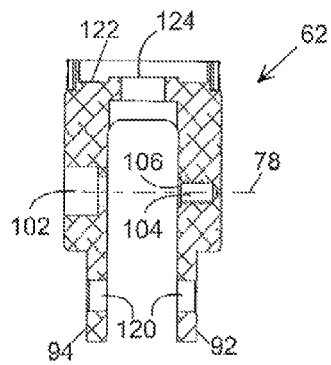
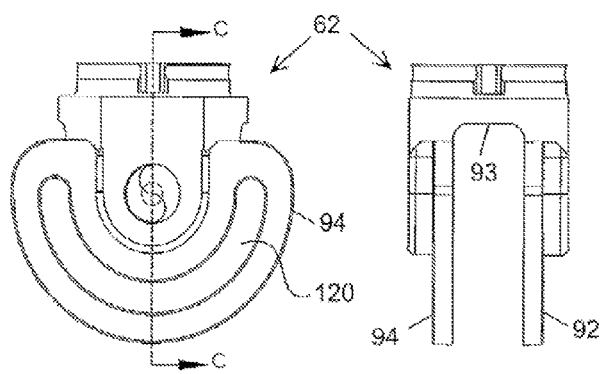
FIG. 12　　　FIG. 10　　　FIG. 11

US 9,097,277 B2

MONOPOD HEAD

CROSS-REFERENCE TO RELATED APPLICATIONS

This application claims the benefit of Provisional App. No. 61/608,327, filed Mar. 8, 2012.

BACKGROUND OF THE INVENTION

The present invention relates to a head for a monopod and, more specifically, to a robust monopod head enabling tilting of a mounted optical instrument either parallel or normal to the instrument's optical axis.

A tripod provides unmoving support of a camera, binoculars, telescope or other optical instrument. This is particularly important when photographing with a long exposure time where even slight movement can cause blurring of the image. While a tripod provides excellent stability, a monopod provides better control of the instrument than handholding, particularly when using long, heavy telephoto lenses and a monopod is typically lighter, smaller and more portable than a tripod. The freedom of movement offered by a monopod's single point of support makes it easier to pan shots and visually acquire moving objects. The combination of mobility and stability offered by a monopod often makes the monopod the support of choice for optical instruments in the field where monopods are commonly used by wildlife and sports photographers.

While a camera or other optical instrument could be attached directly to a monopod, the stability provided by the monopod is adversely affected if the monopod is tilted to orient the camera or other instrument. A ball head is often used in conjunction with a monopod to enable tilting of the instrument relative to the monopod. However, ball heads commonly have a restricted range of motion and the friction setting mechanism is often not sufficiently robust to restrain instruments with long, heavy lenses particularly when the monopod is moved. What is desired, therefore, is a robust head for a monopod that enables a large, heavy instrument to be adequately restrained but easily tilted through a wide range of movement in either direction relative to the longitudinal axis of the monopod with the optical axis of the instrument either aligned parallel or perpendicular to the axis about which the instrument is being tilted.

BRIEF DESCRIPTION OF THE DRAWINGS

FIG. 8 is a perspective view of a top for the monopod head of FIG. 3.

FIG. 9 is a plan view of the monopod head top of FIG. 8.

FIG. 10 is an elevation view of the monopod head top of FIG. 8.

FIG. 11 is an elevation view of the right side of the monopod head top as illustrated in FIG. 10.

FIG. 12 is a section view of the monopod head top of FIG. 11 taken along line C-C.

DETAILED DESCRIPTION OF PREFERRED EMBODIMENTS

Figure 1:
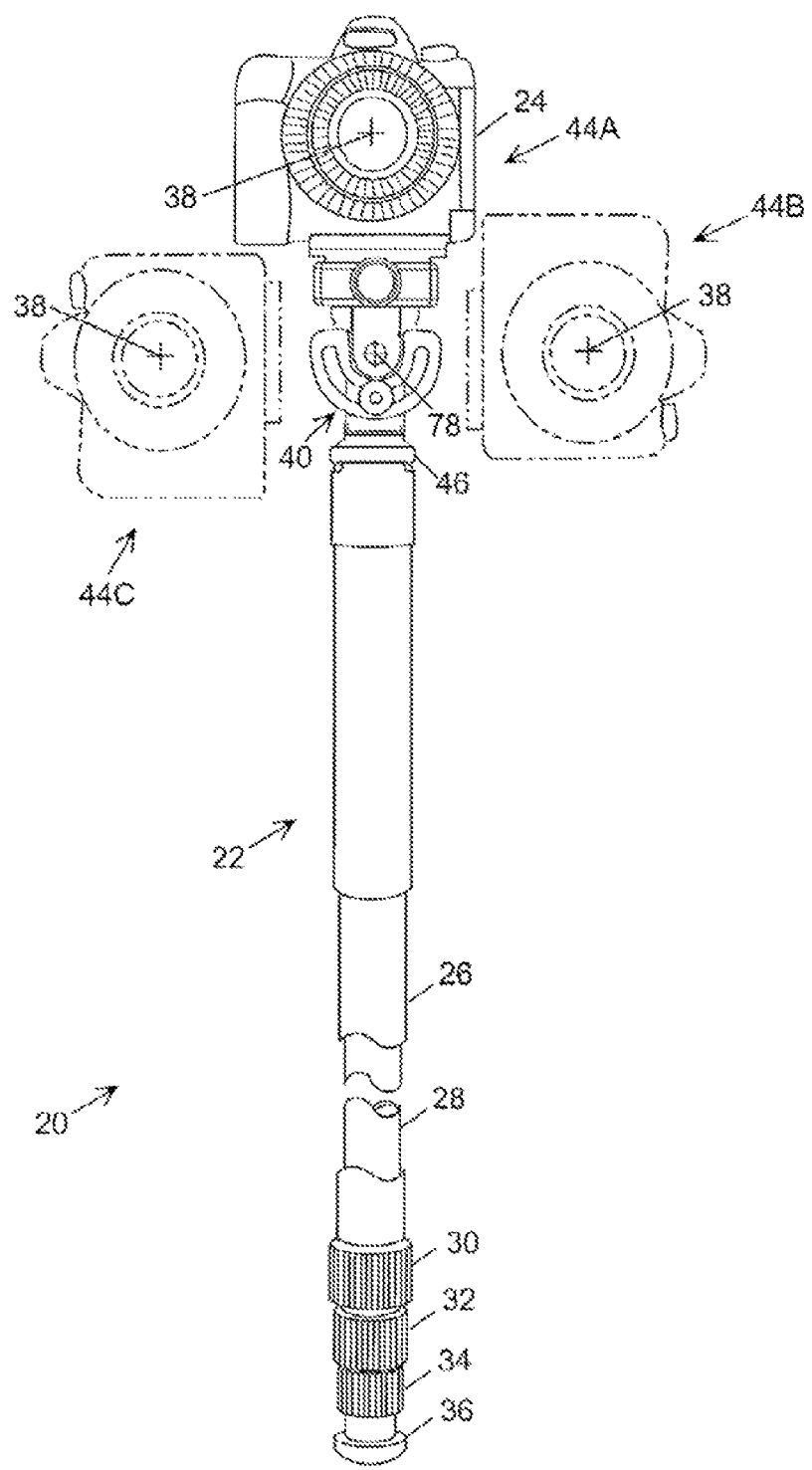
FIG. 1 is an elevation view of a first assembly comprising a monopod, a monopod head and a camera.

Referring in detail to the drawings where similar parts are identified by like reference numerals, and, more particularly to FIG. 1, a monopod 22, sometimes called a unipod, is an elongate, single pole that is commonly used to help support an optical instrument such as a camera 24, telescope or binoculars. Monopods commonly comprise multiple folding sections or telescoping tubular sections 26, 28 that slide within each other to enable the extension of the monopod from a retracted length facilitating transportation and storage to a length useful for a standing user of an optical instrument such as a camera. Relative movement of the various telescoping sections of a monopod is commonly controlled by twist locks 30, 32, 34 which are rotatable to release the sections for relative movement and to restrain movement of the sections. The monopod 22 is equipped with a foot 36 that resists slippage.

Steadying a camera with a monopod enables sharper images with slower shutter speeds than handheld shooting. The reduction of shaking in the vertical plane achievable with a monopod also reduces small random movements of video cameras and sharper images with other optical instruments. A camera or other instrument can be mounted directly on a monopod but to enable acquisition of a desired image, the monopod often must either be moved or tilted to reorient the instrument's optical axis or the camera's image capturing device. Tilting of a monopod adversely affects the ability of the monopod to steady the instrument. As a result, monopods are often equipped with a ball head allowing some freedom to tilt the instrument while enabling the user to keep the monopod more vertical for better stability. However, the universal movement of a ball head which is useful on a tripod is of limited utility when using a monopod because the instrument can be panned by rotating the monopod-instrument assembly 20 on the foot. Further, the friction lock of a ball head can be problematic, particularly when an instrument with a long, heavy lens is attached to the monopod. As the instrument is tilted, the force required to restrain the ball in the ball head varies which can make the friction exerted on the ball head inadequate to restrain the instrument in some attitudes or so great as to cause the lightweight monopod to move when the user attempts to move the instrument relative to the monopod.

Figure 2:
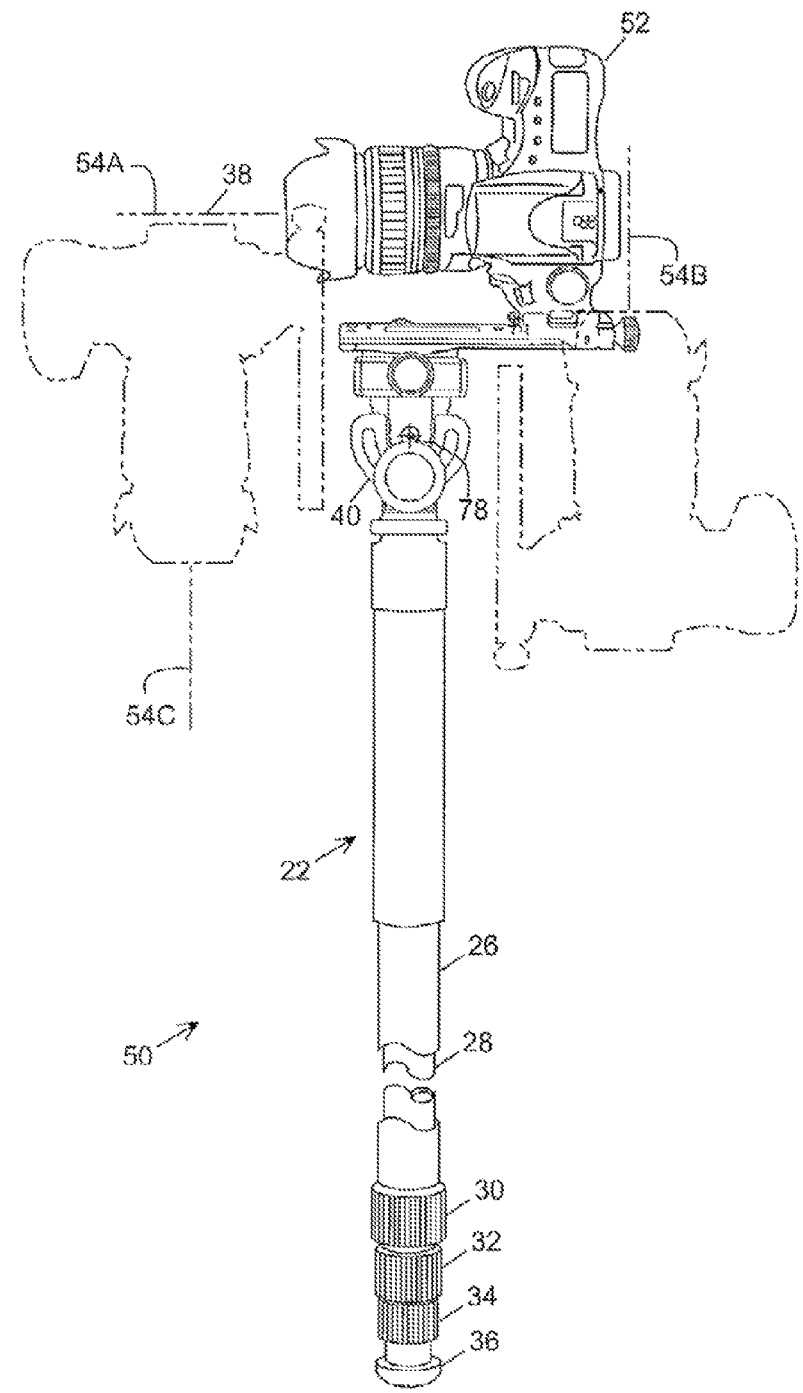
FIG. 2 is an elevation view of a second assembly comprising a monopod, a monopod head and a camera.
Figure 3:
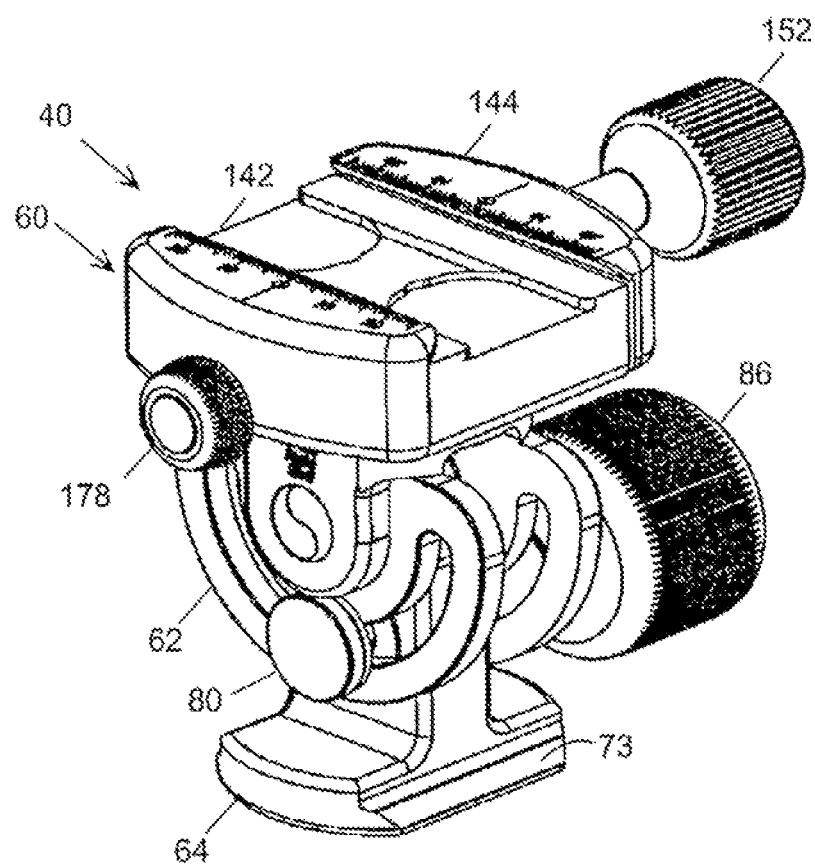
FIG. 3 is a perspective view of the monopod head of FIG. 1.
Figure 4:
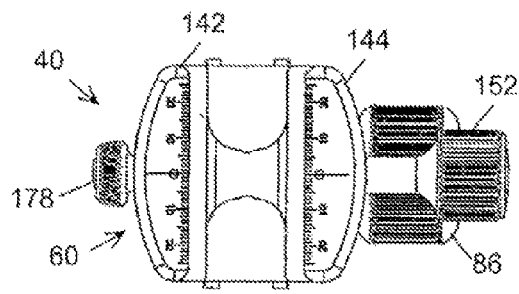
FIG. 4 is a plan view of the monopod head of FIG. 3.
Figures 5, 6:
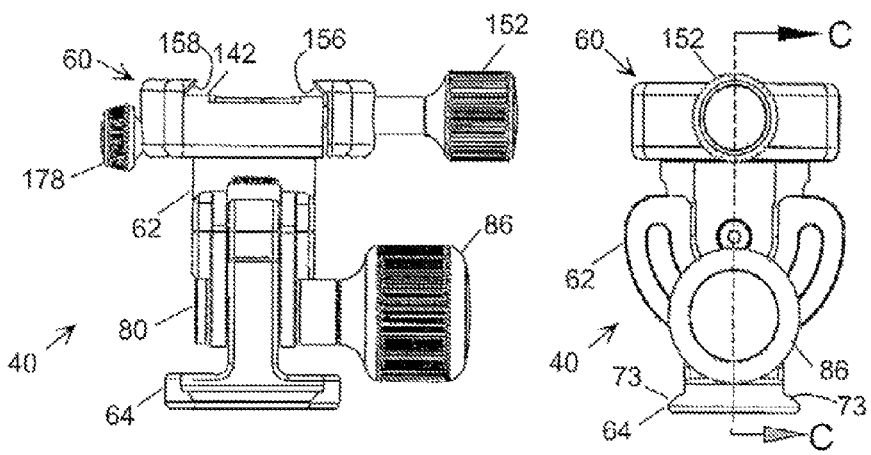
FIG. 5 is an elevation view of the monopod head of FIG. 3.
FIG. 6 is an elevation view of the right side of the monopod head as illustrated in FIG. 5.
Figure 7:
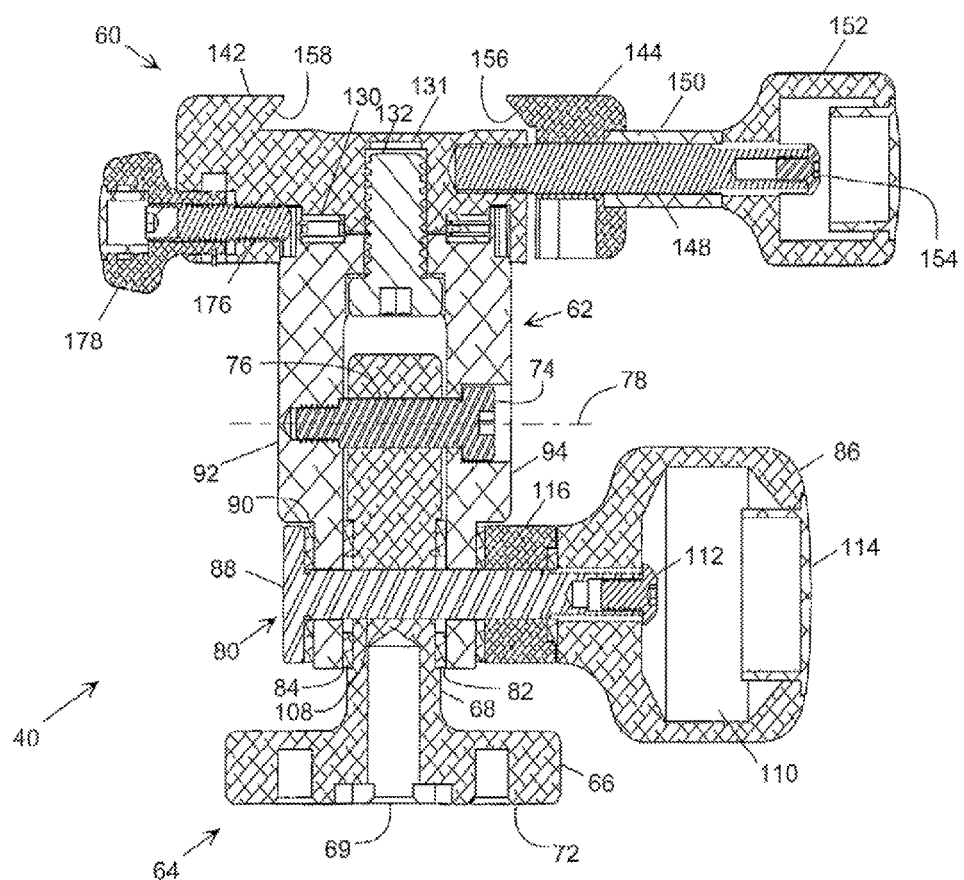
FIG. 7 is a section view of the monopod head taken along line C-C of FIG. 6.

In the monopod assemblies 20 and 50 of FIGS. 1 and 2, respectively, a monopod head 40 is used to connect the cameras 24, 52 and the monopod 22. The monopod head 40 enables the camera or other instrument to be tilted relative to the longitudinal axis of the monopod with the optical axis of the lens 38, the longitudinal axis of the elongate lens assembly, either parallel to the axis about which the instrument is tilted as illustrated in FIG. 1 or perpendicular to the axis about which the camera is tilted as illustrated in FIG. 2. With the monopod 22 vertical for best stability, the camera can be tilted toward either side of the monopod with the optical axis 38 of the lens parallel to the tilt axis 78 to change the orientation of the camera's image capture device from a landscape orientation 44A, to a portrait orientation 44B, 44C. Or, with the optical axis 38 normal to the tilt axis 78 the camera can be tilted either "up" or "down" from an orientation perpendicular to the longitudinal axis of the monopod 54A to respective positions 54B, 54C where the optical axis of the instrument is parallel to the longitudinal axis of the monopod.

Referring also to FIGS. 3-7, the monopod head 40 comprises, generally, an instrument mount 60 rotatably attached to a top 62 which is pivotally mounted on a base 64. The base 64 has a substantially T-shaped cross-section comprising a foot portion 66 and a stem portion 68 which projects normal to the foot portion and substantially parallel to the longitudinal axis of the monopod when the head is attached to a monopod. The foot portion of the base is securable to the head of a monopod 22. Typically, a monopod is equipped with a threaded stud that protrudes from a mounting plate 46 at the end of the monopod and which is engageable with a threaded bore 69 in the mounting foot portion 66 of the monopod head's base 64. The monopod head is threaded onto the protruding stud until the bottom surface 72 of the foot portion 66 of the base 64 engages the mounting plate 46 on the end of the monopod. However, the base of the monopod head could be secured to the monopod by other mechanisms. For example, a threaded stud protruding from the foot portion 66 of the monopod head could be arranged for engagement with a threaded bore in the mounting plate on the end of the monopod. In addition, opposing edge surfaces 73 of the foot portion 66 of the base 64 are flared for engagement with corresponding surfaces of a clamp which can be secured to the end of the monopod.

Referring also to FIGS. 8-12, the top 62 has a generally U-shaped cross-section comprising a pair of substantially parallel, projecting legs 92, 94 and a leg connecting portion 93. The projecting legs 92, 94 include portions defining concentric bores 102, 104 and the top 62 is pivotally mounted on the base 64 by arranging a leg on either side of the stem portion 68 of the base and installing a shoulder bolt 74 in the concentric bores 102, 104 in the legs and a corresponding bore 76 defined by portions of the stem. The threaded portion of the shoulder bolt 74 engages an internal thread in a bore 104 in one of the projecting legs and is secured, without deforming the legs, by tightening the shoulder of the bolt against a step 106 in the threaded bore. The top 62 is arranged to pivot relative to the base on a tilt axis 78 having an orientation fixed relative to the base and coincident with the longitudinal centerline of the shoulder bolt.

The torque generated by the friction mechanism of a ball head is limited by the short distance between the friction element and rotational center of the ball and the limited amount of friction that can be attained with the smooth ball. Pivoting of the top 62 of the monopod head is controlled by a brake mechanism comprising a brake bolt 80, friction elements 82, 84 and a lock knob 86. The brake bolt 80 has a head 88 which bears on a washer 90 in contact with an outer surface of one of the projecting legs 92 of the monopod head's top. The shank of the brake bolt 80 passes through a portion of each of the projecting legs 92, 94 that defines a slot 96, 98 that extends in a semi-circular arc radially displaced from the respective concentric bore 102, 104 for the shoulder bolt and through a portion of the stem 68 that defines a brake bolt aperture 108. The lock knob 86 is threaded on the end of the shank of the brake bolt 80 opposite the bolt's head 88. The lock knob 86 has a large diameter to facilitate the user's grip on the knob and operation of the brake. The lock knob includes portions defining an axial central cavity 110. The lock knob 86 is secured against disengagement from the threads of the brake bolt shank by a lock screw 112 that is in threaded engagement with a longitudinal bore in the shank of the brake bolt and which bears on a surface in the interior of the lock knob to prevent the internal threads of the lock knob from disengaging from the external threads of the brake bolt. A lock knob cover 114 closes the open end of the cavity 110 in the lock knob.

Figure 13:
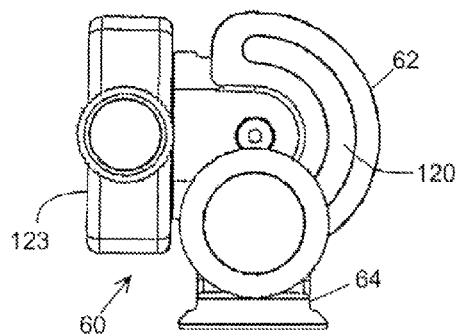
FIG. 13 is an elevation view of the monopod head with a surface of an instrument mount tilted normal to the lower surface of the head's base.
Figure 14:
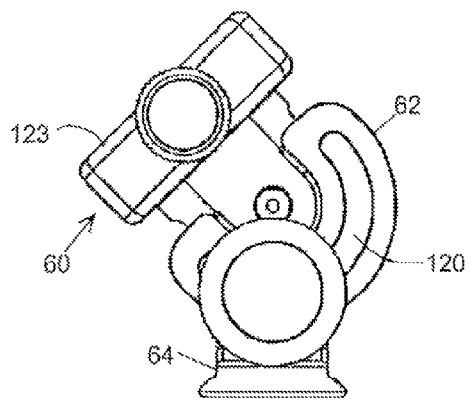
FIG. 14 is an elevation view of the monopod head with a surface of the instrument mount tilted at approximately 45 degrees to the lower surface of the head's base.

When the lock knob 86 is rotated to draw the head 88 of the brake bolt 80 toward the lock knob, the force exerted on the projecting legs 92, 94 of the top by the head of the brake bolt and a spacer 116 separating the lock knob and the projecting leg 94 causes the projecting legs to deform and compress the friction material 82, 84 between the projecting legs and the stem portion 68 of the base 64. Rotating the lock knob in the opposite direction releases the tensile force exerted on the lock bolt allowing the projecting legs to separate reducing the friction between the top and the base and enabling the top to pivot on the pivot bolt 74. When the top pivots on the pivot bolt the brake bolt is displaced in the slots 120. As illustrated in FIGS. 13 and 14, the slots 120 in the projecting legs extend at least the length of a semicircular arc enabling a surface 123 of the instrument mount 60 to be tilted through angles of at least ninety degrees either side of a central position. The monopod head can restrain instruments weighing up to 70 lbs. because high friction is achievable between the top and the base and the friction force is applied at a substantial distance from the pivot axis.

The leg connecting portion 93 of the top 62 defines a toroidal bearing surface 122 that surrounds portions defining an upper aperture 124 having an axis substantially normal to the axis 78 of the concentric bores 102, 104 for the shoulder bolt 74. An instrument mount 60, supported by a friction reducing bearing 130 engaging the bearing surface 122 is securable to the monopod head by a bolt 132 passing through the upper aperture 124. On the other hand, the instrument mount could be secured to the top of the monopod head by a bolt extending through the body of the instrument mount and engaging threads in the upper aperture 124 or by some other means.

Figure 15:
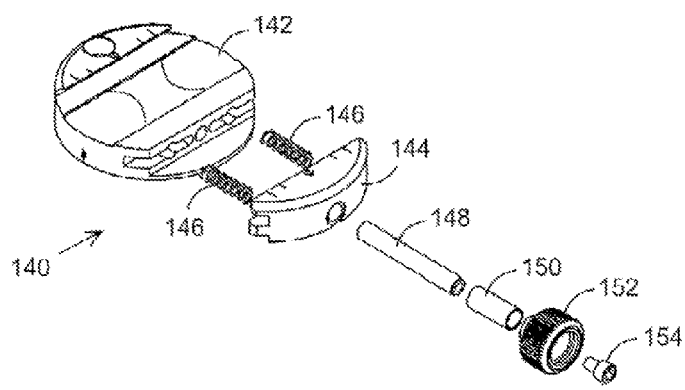
FIG. 15 is an exploded view of an instrument mounting clamp.

Preferably, the instrument mount 60 comprises a clamp having a clamp body 142 defining a threaded aperture 131 engaged by the bolt 132 passing through the upper aperture 124. Referring to also FIG. 15, the clamp 140 includes a clamp body 142 and a clamp jaw 144. The clamp jaw 144 is engaged with the clamp body 142 by a pair of clamp springs 146. The springs 146 exert an outwardly directed force on the clamp jaw 144. The clamp jaw 144 is secured in place by the combination of a clamp screw 148 in threaded engagement with the clamp body, a clamp sleeve 150 surrounding the clamp screw 148, a clamp knob 152, and a screw 154. The clamp sleeve 150 sets the spacing for the clamp knob 152 and presses against the exterior of the clamp jaw 144. As the clamp knob 152 is rotated to release the clamp jaw 144, the clamp jaw will be pressed outwardly by the springs thereby opening the clamp and keeping the clamp jaw 144 in tension to maintain it in a suitable position. As the clamp knob 152 is tightened on the threaded claim screw 148, the clamp jaw 142 will be pressed toward the surface 158 of the clamp body closing the clamp and securing any plate or optical instrument (e.g., camera, video camera, etc.) between opposing surfaces 156 and 158 of the clamp jaw and the clamp body.

Figure 16:
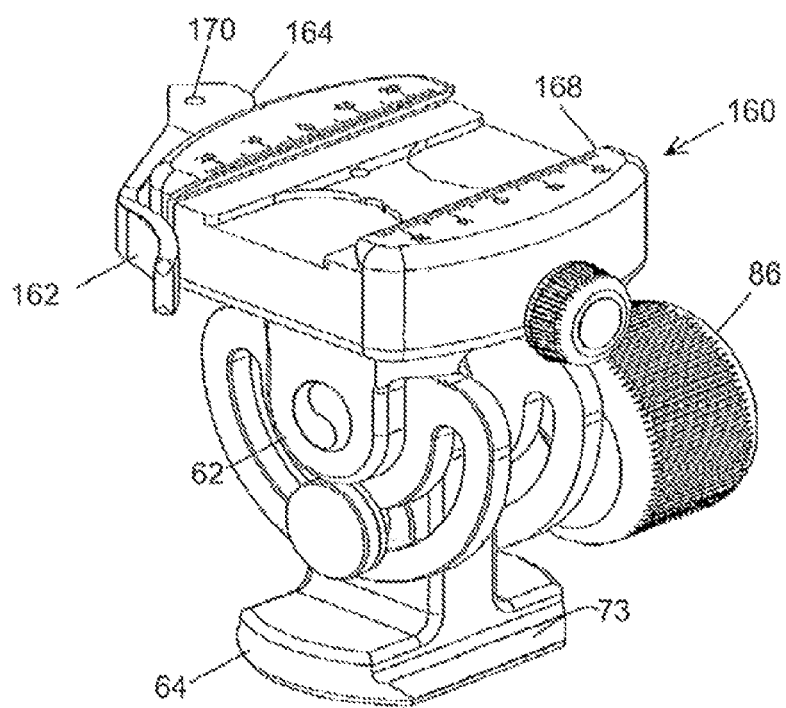
FIG. 16 is a perspective view of a monopod head and a lever operated clamp.

Referring also to FIG. 16, the instrument mount may also comprise a clamp 160 operable by a clamp lever 162 that includes an eccentric portion 164 that moves the clamp jaw 166 relative to the clamp body 168 when the lever is pivoted about a lever pin 170.

A toroidal indexing ring 172 projects normal to the bearing surface 122 of the top 62. The indexing ring comprises portions defining a plurality of indentations 174. Preferably, the indexing ring includes four indentations spaced at intervals around the ring with a pair of indentations 174A, 174B aligned with the axis 78 of the bores 102, 104 that receive the pivot bolt 74 and a second pair of indentations 174C, 174D on an axis 175 normal to the axis 78 of the pivot bolt bores. An indexing screw 176 with a secured indexing knob 178 is threaded into a radially extending aperture in the clamp body 142. The end of the indexing screw 176 proximate the indexing ring 172 is arranged to engage the respective one of the indentations 174 and secure the clamp body in discrete rotational positions relative to the top enabling the optical axis of the instrument to be aligned either parallel to the pivot axis 78 or normal to the pivot axis.

The monopod head 40 provides a full range of motion for a monopod mounted instrument and includes a robust braking system to securely control the position of the an optical instrument weighing up to 70 pounds.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A head for securing an instrument to a monopod, said head comprising:
   (a) a base securable to said monopod and said base including a stem;
   (b) a top comprising plural legs and a leg connection portion including a bearing surface, said plural legs projecting substantially normal to said bearing surface, each leg including a portion defining a pivot aperture and a portion defining an arced slot displaced radially from said pivot aperture;
   (c) a pivot bolt engaging said plural legs and pivotally securing said top to said stem;
   (d) a brake operable to selectively alter friction between a leg and said stem;
   (e) an instrument mount rotatably supported by said bearing surface;
   (f) a toroidal indexing ring projecting substantially normal to said bearing surface and comprising a surface having plural indentations; and
   (g) an index pin radially movable in said instrument mount and engageable with the ones of said plural indentations.

2. A head for securing an instrument to a monopod, said head comprising:
   (a) a base securable to said monopod;
   (b) a top securable to an instrument and attached to said base, said top including a surface arranged to pivot about a pivot axis in a first direction from a first orientation to a second orientation substantially normal to said first orientation and arranged to pivot in a second direction from said second orientation to a third orientation substantially normal to said first orientation, said base restricting said pivot axis to a single orientation relative to said base such that said single orientation relative to said base is not adjustable, said top selectively inhibited from said rotation with respect to said base about said pivot axis by a brake that selectively engages a pair of surfaces in a manner that does not engage a member about which said first axis is pivoted;
   (c) wherein said surface is rotatable about a rotation axis substantially normal to said pivot axis;
   (d) an indexer arranged to secure said surface against rotation in ones of a plurality of discrete angular positions.

3. The head for securing an instrument to a monopod of claim 2 further comprising said brake arranged to enable selective altering of friction between said base and said top.

4. A head for securing an instrument to a monopod, said head comprising:
   (a) a base securable to said monopod and said base including a stem;
   (b) a top comprising plural legs and a leg connection portion including a bearing surface, said plural legs projecting substantially normal to said bearing surface, each leg including a portion defining a pivot aperture and a portion defining an arced slot displaced radially from said pivot aperture;
   (c) a pivot bolt engaging said plural legs and pivotally securing said top to said stem;
   (d) a brake operable to selectively alter friction between a leg and said stem; and
   (e) an instrument mount rotatably supported by said bearing surface such that said single orientation relative to said base is not adjustable, said top selectively inhibited from said rotation with respect to said base about said pivot bolt by said brake located that selectively engages a pair of surfaces in a manner that does not engage said pivot bolt;
   (f) wherein said brake comprises:
      (i) a friction element disposed between a leg and said stem;
      (ii) a brake bolt slidable in said arced slot and including a head bearing on a first of said plural legs;
      (iii) a knob in threaded engagement with said brake bolt, said knob bearing on a second of said plural legs such that rotation of said knob alters friction between at least one leg and said stem.

* * * * *